US009615205B2

(12) United States Patent
Jodlauk et al.

(10) Patent No.: US 9,615,205 B2
(45) Date of Patent: *Apr. 4, 2017

(54) NETWORK SERVICE OF A CELLULAR COMMUNICATION NETWORK COVERING A GEOGRAPHICAL AREA

(71) Applicant: Telefonaktiebolaget LM Ericsson (publ), Stockholm (SE)

(72) Inventors: Gordian Jodlauk, Würselen (DE); Guido Gehlen, Neuss (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,034

(22) Filed: Mar. 15, 2016

(65) Prior Publication Data

US 2016/0198297 A1 Jul. 7, 2016

Related U.S. Application Data

(63) Continuation of application No. 13/881,830, filed as application No. PCT/EP2010/066226 on Oct. 27, 2010, now Pat. No. 9,319,836.

(51) Int. Cl.
*H04W 4/02* (2009.01)
*H04W 4/04* (2009.01)
*H04W 8/02* (2009.01)

(52) U.S. Cl.
CPC ........... *H04W 4/021* (2013.01); *H04W 4/027* (2013.01); *H04W 4/046* (2013.01); *H04W 8/02* (2013.01)

(58) Field of Classification Search
CPC ................ H04W 4/021; H04W 4/027
(Continued)

(56) References Cited

U.S. PATENT DOCUMENTS 6,012,012 A 1/2000 Fleck et al.
6,226,686 B1 5/2001 Rothschild et al.
(Continued)

FOREIGN PATENT DOCUMENTS

CN 1692658 11/2005
EP 0 810 803 A2 12/1997
(Continued)

OTHER PUBLICATIONS

International Search Report, PCT/EP2010/066226, May 30, 2011.
(Continued)

*Primary Examiner* — Marisol Figueroa
(74) *Attorney, Agent, or Firm* — Myers Bigel, P.A.

(57) ABSTRACT

A method for providing a network service of a cellular communication network covering a geographical area for a plurality of mobile terminals, the method comprising: defining a grid covering at least a part of the geographical area with grid fields, framed by grid lines and spaced by a grid spacing; providing grid information comprising reference point information and information on said grid spacing, generating crossing information in response to one of the plurality of mobile terminals crossing one grid line, based on said grid information and on position information of the at least one mobile terminal, and keeping grid field information for at least one grid field comprising identification information of the one mobile terminal when inside the one grid field based on said crossing information.

24 Claims, 8 Drawing Sheets

(58) Field of Classification Search
USPC .............................................. 455/456.1–457
See application file for complete search history.

(56) References Cited

U.S. PATENT DOCUMENTS

| | | | |
|---|---|---|---|
| 6,584,314 | B1 | 6/2003 | Haumont et al. |
| 6,697,625 | B1 | 2/2004 | Rune |
| 6,721,755 | B1 | 4/2004 | Lee |
| 7,075,929 | B2 | 7/2006 | Korus et al. |
| 8,270,997 | B2 | 9/2012 | Sories et al. |
| 8,831,863 | B2 | 9/2014 | Soulie et al. |
| 9,319,836 | B2* | 4/2016 | Jodlauk ................. H04W 4/021 |
| 2002/0115453 | A1 | 8/2002 | Poulin et al. |
| 2004/0165594 | A1* | 8/2004 | Faccin ................... H04L 29/06 370/395.2 |
| 2005/0240378 | A1 | 10/2005 | Smith et al. |
| 2006/0004515 | A1 | 1/2006 | McDonough |
| 2006/0099971 | A1 | 5/2006 | Staton et al. |
| 2006/0206610 | A1 | 9/2006 | Ling et al. |
| 2006/0248222 | A1 | 11/2006 | Saito |
| 2007/0249340 | A1 | 10/2007 | Hiltunen et al. |
| 2008/0070590 | A1 | 3/2008 | Miyajima et al. |
| 2009/0131080 | A1 | 5/2009 | Nadler et al. |
| 2009/0298505 | A1 | 12/2009 | Drane et al. |
| 2014/0038634 | A1 | 2/2014 | Eskicioglu |

FOREIGN PATENT DOCUMENTS

| | | |
|---|---|---|
| EP | 1 289 220 A1 | 3/2003 |
| GB | 2 406 472 A | 3/2005 |
| WO | WO 03/037001 A1 | 5/2003 |
| WO | WO 2010/050851 A1 | 5/2010 |

OTHER PUBLICATIONS

International Preliminary Report on Patentability, PCT/EP2010/0066226, Feb. 5, 2013.
Office Action for corresponding Application No. 201080070969.6, dated Nov. 4, 2015, 6 pgs.

* cited by examiner

NETWORK SERVICE OF A CELLULAR COMMUNICATION NETWORK COVERING A GEOGRAPHICAL AREA

CROSS-REFERENCE TO RELATED APPLICATION

This U.S. non-provisional patent application is a continuation of U.S. patent application Ser. No. 13/881,830, filed on Apr. 26, 2013; which itself is a 35 U.S.C. §371 national stage application of PCT international Application No. PCT/EP2010/066226, filed on 27 Oct. 2010, the disclosures and contents of both of which are incorporated by reference herein in their entirety. The above-referenced PCT International Application was published in the English language as International Publication No. WO 2012/055433 A1 on 3 May 2012.

TECHNICAL FIELD

The present invention relates to a method of providing a network service of a cellular communication network, to a system for providing a network service of a cellular communication network, a method of operating a network entity providing a network service of the cellular communication network, a respective network entity, to a computer program that is loadable into a processing unit of such a network entity, and to a mobile terminal for use in a cellular communication network.

BACKGROUND

It is known to provide so-called Location Based Services (LBS) in cellular communication networks, such as a cellular wireless telephone network. Such services typically comprise a mechanism for estimating the location of a mobile terminal, e.g. with the help of a Global Positioning System (GPS, Galileo, Glonass) or a Mobile Positioning System (MPS) that may use Cell-ID information or algorithms based on timing advances and on triangulation for determining the position of a mobile terminal. Said LBS mechanisms are known to enable content delivery based on the location of the user (mobile terminal). Based on the knowledge of the mobile terminal's location, specific location based services can be offered to said mobile terminal, e.g. alert messages for upcoming road traffic hazards or indications toward deviations to avoid traffic jams. It is furthermore known to broadcast information with the help of so-called Cell Broadcast Services (CBS), in order to distribute information to mobile terminals within one or more cells. The respective mobile terminals have to enable the listening of the respective broadcast channel. So-called Multimedia Broadcast and Multicast Service (MBMS) are known that provides a broadband broadcast to mobile terminals.

Such data communication in cellular communication networks is dominated by using a request response communication mechanism that is triggered by the mobile terminal, or point-to-point (P2P) data communication using Short Message Service (SMS) and Multimedia Message Service (MMS). Further, said LBS technologies or the aforementioned broadcast technologies are being introduced for enabling an enriched request response communication.

However, the conventional methods and concepts for providing location based (geographical) unicast network services in cellular communication networks may suffer from various drawbacks. Said unicast network services employ mechanisms for information delivery to the mobile terminals by establishing a dedicated connection to the mobile terminals and/or sending messages (SMS/MMS) specifically addressed to said mobile terminals. In particular, such concepts may rely on keeping a client database with all clients' locations (i.e. the locations of the mobile terminals) and on updating this information on a regular basis. The regular update may be effected by requesting status data from the mobile terminals, e.g. location updates. In the case of vehicle mounted mobile terminals this may be necessary frequently, since the travelling speed of the vehicles results in a substantial change of the location within even relatively short periods of time (e.g. a vehicle moving at 180 km/h moves around 1,500 m within 30 seconds). This may—in turn—result in an occupation of substantial network communication and processing resources by such a geographical network service, since every service using the location-based addressing would load the cellular communication network with additional data traffic for continuous client localization.

In addition to the above, the actual locations of the mobile terminals, or at least information indicating the respective locations, have to be kept in some database in order to allow for any location-based network service. Further, in order to be able to send specific messages to these location-based selected mobile terminals, there will be also an association of the location data to identification data of the respective mobile terminals, for example their respective telephone numbers for sending and addressing messages thereto. This implies that the respective information represents sensitive data which a Mobile Network Operator (MNO) of a specific cellular communication network may not be allowed to reveal freely to third parties. Contractual arrangements between the MNO and the users who are the subscribers to the services of the cellular communication network and own—or at least operate—the mobile terminals, and/or national legislation may require that any association of an actual location of a mobile terminal (i.e. also a user) to identification information is to be dealt with confidentiality, and must thus be kept inside the MNO's network so that third parties cannot gain access to this information. The MNO <1>s network may not only comprise the cellular communication network that the MNO operates or rents from some other provider for offering cellular communication network based services, but also the respective internal networks, such as the respective intranets and correspondingly secured interfaces to the internet. Revealing the location information in combination with identification information may require the consent of every individual mobile terminal user. As a consequence, any location-based addressing may only be available to specific services and not to other services and/or other service providers. As far as the regular location update is concerned, the disadvantage of such regular probe data can be manifold. On one hand, there is generated a heavy network load when the client database is queried to determine other clients in the proximity of an event, say a road accident. This load will increase quadratic with the total number of served clients and mobile terminals and dimensioning the service for a larger area with the correct capacity may become challenging. On the other hand, regular and unmanaged upload of probe data may block valuable radio resources for other users and services. However, such higher network load in a cellular communication network may also have a negative impact on the delay performance.

Still further, the accuracy of the position information differs for different technologies. The above-mentioned network-based positioning MPS provides only an accuracy of several hundred meters depending on the cell diameter.

Although satellite-based localisation mechanisms are more precise down to several meters, this can still be not accurate enough since vehicle mounted mobile terminals may—as already mentioned above—travel fast. In order to keep a geographical network service in such situations reliable, it would be required to provide the system with location updates several times per minute.

It is thus an object of the present invention to provide a network service of a cellular communication network for providing information based on the location of the mobile terminals, while avoiding congestion of uplink radio resources and without the need of revealing the client's location information in association with the respective identification information.

SUMMARY

The above-mentioned problems are solved by the subject-matter of the independent claims. Further preferred embodiments are defined in the dependent claims.

According to an aspect of the present invention, a method for providing a network service of a cellular communication network covering a geographical area for a plurality of mobile terminals comprises: defining a grid covering at least a part of the geographical area with grid fields, framed by grid lines and spaced by a grid spacing; providing grid information comprising reference point information and information on said grid spacing, generating crossing information in response to one of the plurality of mobile terminals crossing one grid line, based on said grid information and on position information of the at least one mobile terminal, and keeping grid field information for at least one grid field comprising identification information of the one mobile terminal when inside the one grid field based on said crossing information.

According to another aspect of the present invention, a system for providing a network service of a cellular communication network covering a geographical area for a plurality of mobile terminals comprises a network entity being arranged: to define a grid covering at least a part of the geographical area with grid fields, framed by grid lines and spaced by a grid spacing; to provide to at least one of the plurality of mobile terminals grid information comprising reference point information and information on said grid spacing, and to keep grid field information for at least one grid field comprising identification information of the one mobile terminal when inside the one grid field based on crossing information, and wherein the one mobile terminal is arranged to generate said crossing information in response to crossing one grid line, based on said grid information and on position information of the one mobile terminal.

According to another aspect of the present invention, a method of operating a network entity providing a network service of a cellular communication network covering a geographical area for a plurality of mobile terminals comprises: defining a grid covering at least a part of the geographical area with grid fields, framed by grid lines and spaced by a grid spacing; providing to at least one of the plurality of mobile terminals grid information comprising reference point information and information on said grid spacing, and keeping grid field information for at least one grid field comprising identification information of the one mobile terminal when inside the one grid field based on crossing information, wherein said crossing information is generated by said one mobile terminal in response to crossing one grid line, based on said grid information and on position information of the one mobile terminal.

According to another aspect of the present invention, a computer program loadable into a processing unit of a network entity of a cellular communication network is provided, the program comprising code that when running on said processing unit performs a method according to the respective embodiments of the present invention.

According to yet another aspect of the present invention, a mobile terminal for use in a cellular communication network covering a geographical area comprises a processing unit being configured to: receive grid information comprising reference point information and information on grid spacing, wherein a grid covers at least a part of the geographical area with grid fields, framed by grid lines and spaced by said grid spacing; observing a crossing of a grid line based on said grid information and on position information of the mobile terminal; generating crossing information in response to said crossing of a grid line and sending said crossing information to a network entity over the cellular communication network.

BRIEF DESCRIPTION OF THE DRAWINGS

Embodiments of the present invention, which are presented for better understanding the inventive concepts but which are not to be seen as limiting the invention, will now be described with reference to the Figures in which.

DETAILED DESCRIPTION

Within the meaning of the present invention, the term network service is to be understood as the entirety of services and functions within a cellular communication network that, for example, as part of it includes a geographical service to the MNO or other service operators on a provider side, and a localized information service to the mobile terminals on the user side. On the operator side, the term geographical service should be understood as the basic service entity that makes use from the network service, whereas on the user side the term localized information service should be understood as the basic service entity that makes use from the network service. Examples for the localized information service include services that provide mobile terminals with information, based on their respective locations, such as traffic hazard warnings or specific route deviation proposals when the respective mobile terminal's location results in a possible involvement with such traffic hazards and/or traffic jams. Examples for the geographical service include services that make use from the grid field information alone for determining mobile terminal density (e.g. corresponding to a vehicle density) within a specific geographical area and/or services for providing traffic authorities with information on such vehicle densities on specific motorways or in the vicinity of a specific junction. From the latter examples it becomes clear that the geographical service may not necessarily involve sending of messages or broadcasting of information to the mobile terminals at all. As a further example, said geographical service can also be provided to the outside of the cellular communication network, wherein the outside is to be understood as leaving the contractual area between an MNO and the subscribers to the operator's services (i.e. the users of the mobile terminals). Since embodiments of the present invention allow for providing said geographical service without the need of revealing sensitive information to third parties, said outside of the cellular telecommunications network may also include these third parties, i.e. the geographical service can be provided to these parties while keeping any sensitive information inside the required network limits (e.g. cellular telecommunication network as such and/or the MNO'S intranet).

Figure 1:
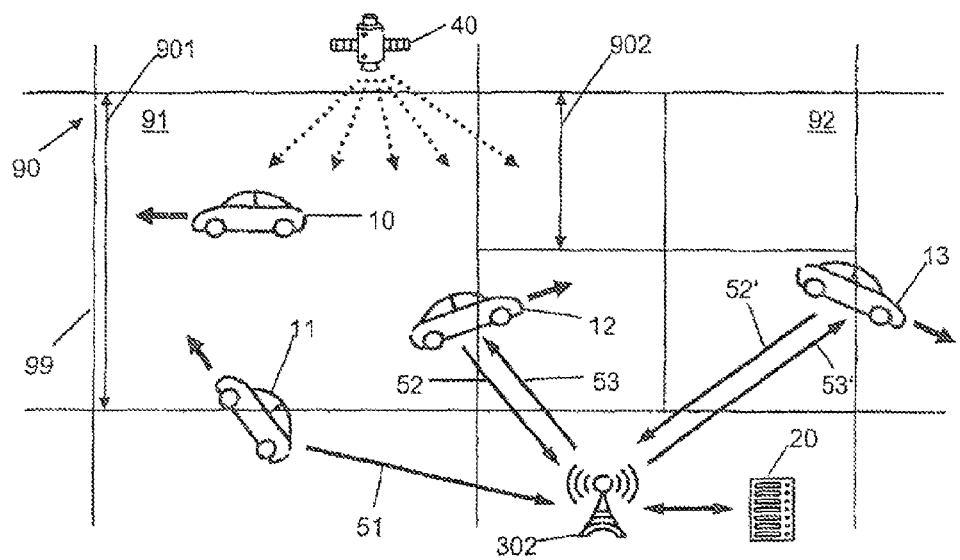
FIG. 1 shows a schematic representation of a grid covering at least a part of the geographical area according to an embodiment of the present invention.

FIG. 1 shows a schematic representation of a grid covering at least a part of the geographical area according to an embodiment of the present invention. As shown in FIG. 1, mobile terminals 10, 11, 12, and 13 are vehicle-mounted and are, thus, represented by moving cars. The geographical area that is covered by the cellular communications network is mapped by a grid 90 with grid lines 99 and grid fields 91 and 92. As can be further seen, the gird may comprise several grid spacings, such as a first grid spacing 901 and a second grid spacing 902 resulting in grid fields of different size, namely the first grid fields 91 and the second grid fields The cellular communication network is provided to the mobile terminals 10-13 by means of a respective Radio Access Network (RAN) 302 of the cellular communication network. Some satellite-based positioning service 40 provides to the mobile terminals 10 to 13 means for determining their respective location. Note, however, that the satellite-based positioning service 40 may well be replaced by a network-based positioning service, such as MPS. According to this aspect of the present invention, there is a network entity 20 of the cellular telecommunications network that provides parts of the network service. In embodiments in which the network service includes a localized information service it may also be referred to introducing a so-called GeoMessaging function into the MNO's network. On one side, this GeoMessaging function maintains some relationship to all mobile terminals (clients) and their geographical location. On the other side it exposes an interface to a multitude of services (MNO internal and external), which allows sending messages into a spatial area without knowing individual client's locations. Said interface may be regarded as the gateway to the users of said geographical service.

The mobile terminals 11-13 as shown in FIG. 1 are assumed to have registered to the network service—or at least the service is accessible to these terminals. Every mobile terminal 11-13 is further assumed to have already been provided with grid information comprising (possibly individual) reference point information and information on the respective grid spacing. With this information and by monitoring their geographical position via the service 40, the mobile terminals 11-13 are able to determine if they cross a grid line 99. According to further embodiments, a certain spatial hysteresis can be included to avoid too frequent toggling between two adjacent grid fields, e.g. when a mobile terminal is moving along a grid line 99. The mobile terminal 10 is assumed to not participate to the network service although it may be still able to use other services of the cellular communications network, such as SMS, MMS, and telephony. Consequently, there is no need to send and/or exchange any information, such as a location update, to the network entity 20. Meanwhile, mobile terminal 11 is just crossing a grid line 99 and thus entering a neighbouring grid field 91 and accordingly sends a location update message 51 {crossing information) to the network entity 20. A grid database of the GeoMessaging function (i.e. network service and/or network entity 20) associates the mobile terminal 11 to the new grid field 91 and determines that the grid spacing 901 for the new field 91 is the same as for the previous one, thus there is no need to send any grid information update to the mobile terminal 11.

Further, mobile terminal 12 is just entering an area with denser, second grid spacing 902, and accordingly provides crossing information 52 to the network service. In this scenario the grid database associates the mobile terminal 12 to the new grid field and additionally sends a grid information update 53 to the mobile terminal 12 so that it knows about the denser grid spacing 902. Mobile terminal 13 illustrates the opposite scenario in which a terminal leaves the area of denser grid spacing 902, involving a further crossing information 52' (location update) and a further grid information update 53' being sent to the terminal 13 by the network entity 20. Starting from some base grid, every grid field may be split into several grid fields with a denser grid spacing and also more than one level of splits can be allowed down to a reasonable grid spacing value, e.g. 100 Meters. The necessity to split or to merge grid fields, i.e. to change the grid spacing locally and/or temporally, may follow various criteria. On one hand the network load for localization should be minimized, this means large grid spacing. On the other hand the target areas should be mapped with a minimal set of grid fields without too much spatial overhead, which imposes a minimal grid spacing which may depend on the network service target area profile. However, the number of mobile terminals associated to one grid field (vehicle density in an area) may no longer be a relevant criterion, since splitting grid field to reduce the number of clients (vehicles) associated to a single grid field, may just result in an increase of network load for location updates.

In a top down view, the client {vehicle-mounted mobile terminals) density in an area may not have an impact on the grid spacing but only on the capacity the network needs to provide. In the context of the present invention, this may imply that the grid management of the network service may only need one criterion. The mapping of network service target areas to grid fields is monitored and if the resulting area size exceeds a threshold (e.g. 200%) the grid fields are split. A split area with a denser grid spacing is the aging and if no similar network service target area is seen within a timeout period (e.g. 1 hour), then the grid fields are merged again. By this method the granularity of the grid, and therewith the network load for localization, stays optimized to the current network service usage pattern.

Such a split procedure can be handled deferred or immediate. For the immediate split, all clients (mobile terminals) in a grid field are informed immediately by some grid information update about the split. Thus the clients will send a location update (grid location information) accordingly. In the deferred case no extra grid information update is provided and only the clients newly entering a grid field by crossing a grid line will know about the denser grid spacing. This will result in a smooth transition of the grid without generating a peak in the network load. For merging the grid fields the deferred method may be the most preferable. As for determining the operational parameters of the network service, official statistics and figures about road traffic may serve for considerations about the frequency of location updates by the clients. The overall average speed of vehicles while on the road may be about 40 km/h. Taking this and an exemplary base grid spacing of 2 km into account, a vehicle will send a location update every 180 s in average. This value may go down to 9 s in areas with highest proposed grid granularity of 100 m. At a first glance the network load (for localization) may increase proportional with the road traffic density as simply the number of clients (vehicles) increases. But in reality this increase may be far less pronounced because with higher traffic density the average speed of the vehicles goes down and the retention period in a grid fields rises, resulting in less frequent grid line crossing and involved location updates by means of generating and/or sending crossing information.

Preferred embodiments of the present invention rely on satellite-based positioning at the mobile terminals (i.e. on the vehicles). Nevertheless, MNOs may deploy a couple of other network-based positioning methods besides GPS based positioning, summarized under the term Mobile Positioning System {MPS}. Some well known techniques are Cell Global Identity with Timing Advance (CGI+TA), Enhanced CGI (E-CGI), Cell ID for WCDMA, Uplink Time Difference Of Arrival (U-TDOA) and Any Time Interrogation (ATI). However, MPS usually performs localization upon request and provides a client's location to a service (provider) outside the operator's network, thus requiring consensus of the user. Where appropriate the GeoMessaging function may also use other positioning functions like MPS.

Figure 2:
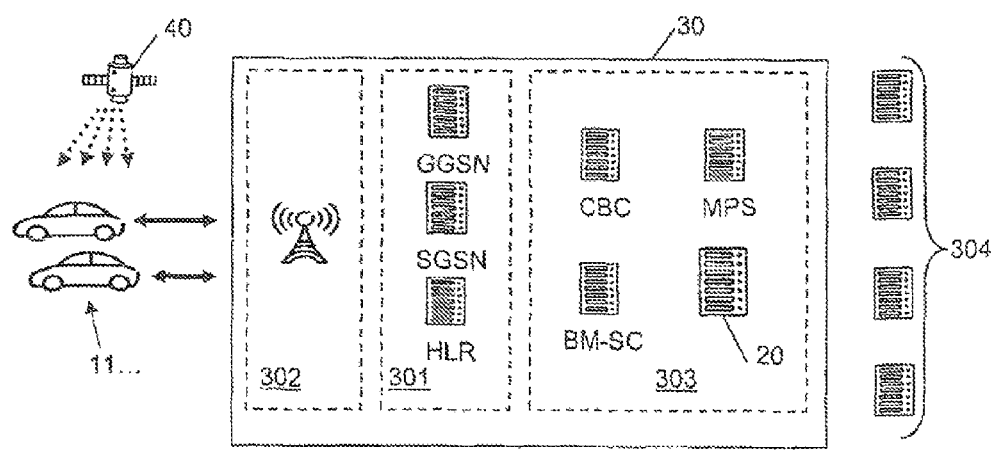
FIG. 2 shows a schematic representation of the system's architecture according to another embodiment of the present invention.

FIG. 2 shows a schematic representation of the system's architecture according to another embodiment of the present invention. FIG. 2 depicts an exemplary deployment overview in an UMTS environment. Besides the cellular network's core 301 and RAN (radio access network) 302 it shows that part of the network service are provide by the network entity 20, amongst other subsystems and nodes 303 in the MNO's network. These other subsystems and nodes 303 may include a Cell Broadcast Center (CBC), a Mobile Positioning System (MPS), and/or a Broadcast Multicast Service Center (BM-SC). Said core 301 may comprise Gateway GPRS Support Node (GCSN), a Serving GPRS Support Node (SGSN), and/or a Home Location Register (HLR).

Other external services 304 may be located outside the cellular communication network 30, that may include a THW Service, a TPEG Service, an intersection assistant, and/or some streaming service. The external services 304 utilizing the network service are drawn outside the MNO's network 30 as this is the general case. However, this is to be understood as not excluding operator specific services inside the cellular communication network 30 which may also use or even use alone the network service. In other words, the proposed network service maintains a smart or virtual relationship to all mobile terminals (vehicles) and their geographical locations. On the other side it exposes an interface to a multitude of services (MNO internal and external), which allows sending messages into a spatial area without knowing individual client's location.

Figure 3:
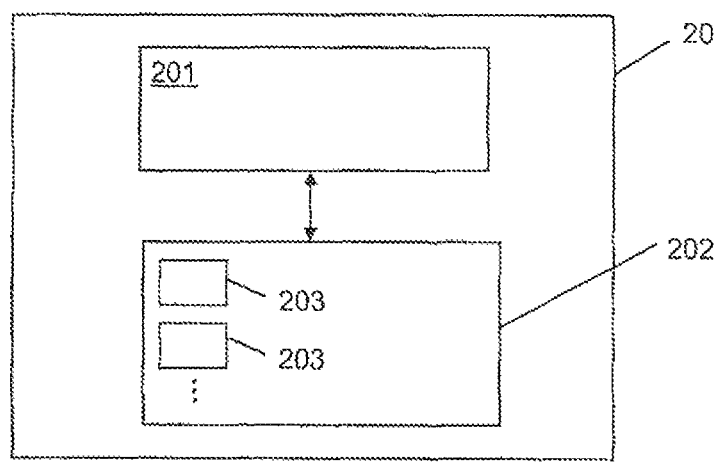
FIG. 3 shows a schematic representation of a network entity for providing a network service of a cellular communication network according to another embodiment of the present invention.

The network service can be deployed in an operator's network as exemplified in FIG. 2 with several services and clients (vehicles) registered. It may be the services 304 sending so-called GeoCast messages to the system and the clients 11 . . . (vehicles) receiving them. On the other hand the clients 11 . . . (vehicles) may send their uplink messages directly to the service. Additionally the clients (vehicles) 11 . . . may keep their location in synchronization with a grid database (see below). FIG. 3 shows a schematic representation of a network entity for providing a network service of a cellular communication network according to another embodiment of the present invention. According to this embodiment, the network entity 20 comprises a processing unit 201 and a memory unit 202 for storing code and/or information that can be processed by the processing unit 201. Within the memory unit 202 there are arranged memory sections 203 that comprise code and/or data in order to provide the following functions: defining a grid covering at least a part of the geographical area with grid fields, framed by grid lines and spaced by a grid spacing; providing to at least one of the plurality of mobile terminals grid information comprising reference point information and information on said grid spacing, and keeping grid field information for at least one grid field comprising identification information of the one mobile terminal when inside the one grid field based on crossing information, wherein said crossing information is generated by said one mobile terminal in response to crossing one grid line, based on said grid information and on position information of the one mobile terminal.

Figure 4:
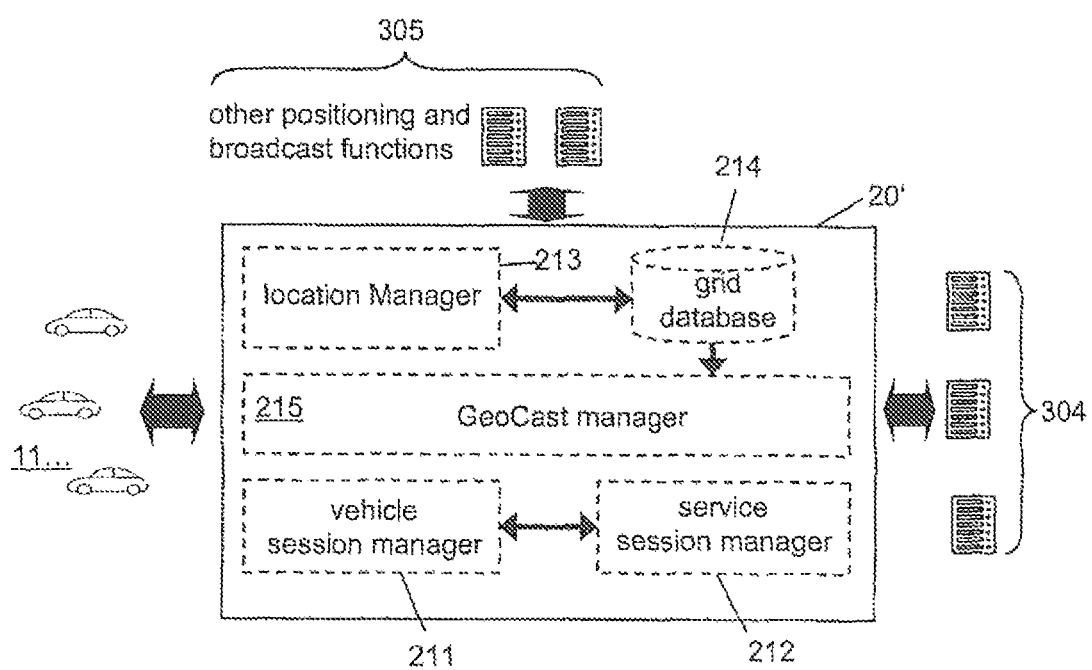
FIG. 4 shows a schematic representation of a network entity for providing a network service of a cellular communication network according to another embodiment of the present invention.

FIG. 4 shows a schematic representation of a network entity for providing a network service of a cellular communication network according to another embodiment of the present invention. In this figure, the components of the network entity 20' and/or the network service in general are shown. The network entity 20' may comprise a vehicle session manager 211 and a service session manager 212 for maintaining its own associations to the mobile terminals (vehicles) 11 . . . and to other, possibly external, services 304. In order to allow end to end uplink communication from the mobile terminals to the services the two session manager components 211, 212 may exchange service address information to handshake an end to end communication session. A location manager 213 receives and handles all location updates (crossing information and/or grid location information) from the mobile terminals 11 . . . and may control the frequency of the location updates such that the cellular communication network's load is minimized and the required precision of localization is maintained. For this purpose it accesses a grid database 214 which manages the serviced spatial region (i.e. the part of the geographical area covered by the grid) in grid fields in grid spacings, spanning the respective area. Depending on the current client spatial density and current addressing load situation the grid database 214 can adapt the grid spacing in areas where needed. The grid database 214 may be further optimized for fast access to the mobile terminals associated to the grid fields.

According to this embodiment, the network entity 20' comprises a so-called GeoCast manager 215. It receives requests with a payload message from the registered services 304. It maps the requested destination area from the used geographical addressing scheme to a set of grid fields maintained in the grid database 214. Then it queries the grid database 214 for the respective mobile terminals associated to this set of grid fields. The payload message is then send to these mobile terminals and the requesting service 304 may be informed with a status (success, failure) or report of some kind (e.g. number of clients reached). The GeoCast manager 215 or grid database 214 may also be aware of spatial areas where other broadcast methods are available within the MNO's network and forward the payload message accordingly.

The registered services 304 may send application level messages to the GeoCast manager 215 using a geographical addressing scheme. The GeoCast manager 215 may then consult the grid database 214 and maps the spatial target area to all grid fields overlapping the target area. If the mapped target grid field's size exceeds the requested target area size by a significant threshold (e.g. 100%), the GeoCast manager 215 may initiate the above-mentioned split procedure of the mapped target tiles within the grid database 214. Then the clients currently associated to the mapped target grid fields may have to be requested from the grid database 214. This may be advantageous with regard to performance and therefore the grid database 214 may be optimized to this type of query. Now the application level message can be sent to all these clients on the respective result list.

Optionally, and if the GeoCast manager 215 is aware of other broadcast capabilities serving the target area, it may also forward the application level message to other broadcast services 305, e.g. a BM-SC. In order to take full advantage of such broadcast functions in the network, clients may indicate to the network service if they are tuned to the corresponding broadcast channel. The grid database 214 then may exclude these clients from the result list. The location manager 213 receives and handles all location updates from the clients and steers in an advantageous way the frequency of the location updates such that the cellular network's load is minimized and the required precision of localization is maintained. Therefore, the complete serviced spatial region is split into a grid with arbitrary regions of different grid field density. On every location update from a client the grid database 214 associates the client with the corresponding grid field. The grid database 214 may itself be optimized for fast access to sets of clients associated to grid fields.

A preferred starting point to optimize the grid database 214 in the required manner is to have simple grid properties. According to embodiments of the present invention this is achieved by defining a base grid with just a single reference point and appropriate base grid spacing. It may not matter which kind of coordinates are used, e.g. Cartesian or geodetic.

Figure 5A:
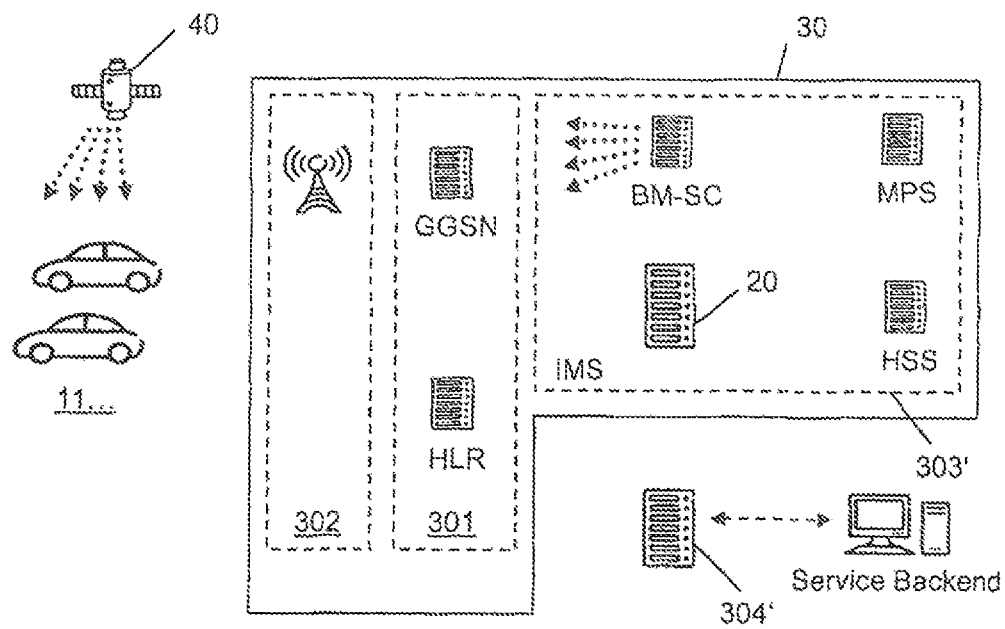
FIGS. 5A to 5C show a schematic representation of a further embodiment of the present invention.
Figure 5B:
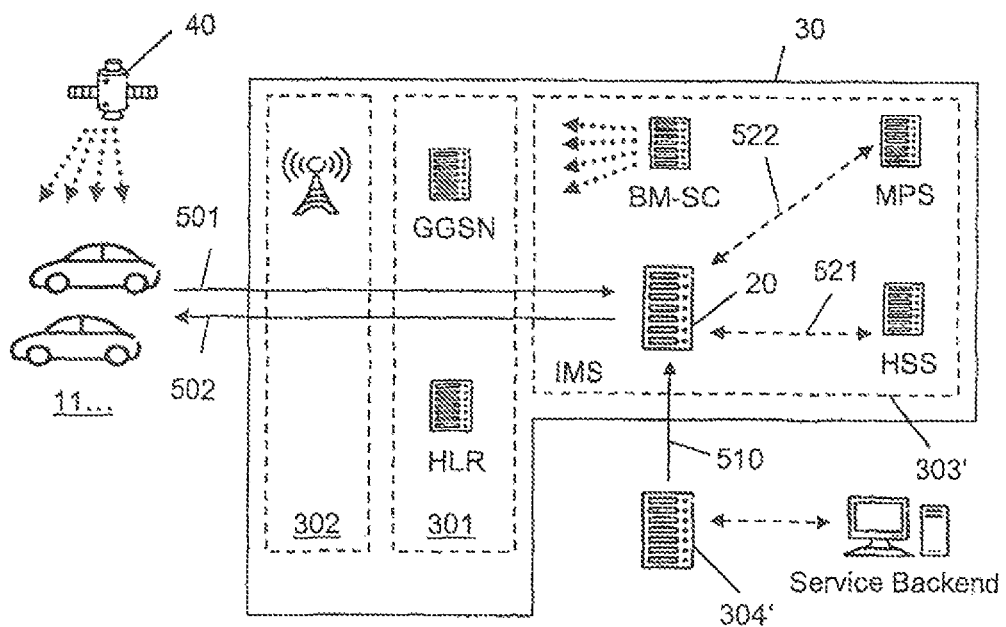
Figure 5C:
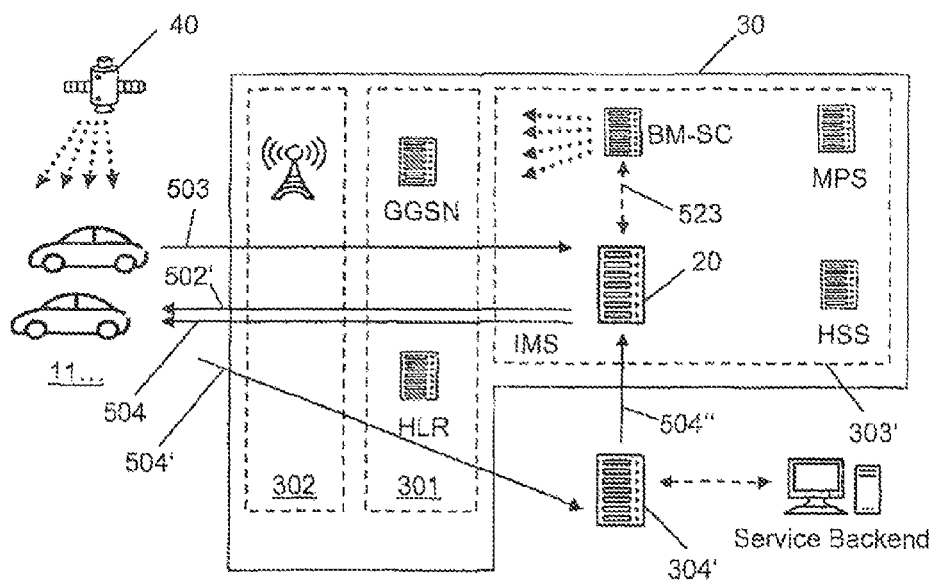

As an example for a meaningful base grid, Germany may serve as a serviced area. If the center of Germany (51° 9' 48" N, 10° 26' 52" O) is taken as a reference point and 2 km are taken for the grid spacing, this would result in a grid field size of 4 km<2> and approximately 90.000 grid fields, a number which can easily handled by a state-of-the-art database system. Continuing with this example, there are about 50 million vehicles in Germany. Assuming 20% penetration rate for mobile telematics applications and 25% of all vehicles on the road concurrently, this would result in an average of 28 vehicles per base grid field. The aspect that there will be some areas with much higher vehicle density is addressed by the grid database 214 allowing to define (or even automatically determine) arbitrary areas with a denser grid spacing. There is principally no restriction in the type of geographical addressing scheme to be used. The target area can be defined e.g. as a circle (coordinate and radius), as a rectangle (two coordinates and height) or as a more general representation, a closed polygon of coordinates, as long as it may be defined as grid information and the mobile terminals are able to determine a grid line crossing from some reference point information, current location information, and some spacing interval. In the present description general embodiments and IMS embodiments are discussed. Besides the architectural views and sequence diagrams special attention is given to the interaction of the clients (mobile terminals) with the location manager and grid database of the proposed network service. In general, the network service according to some embodiments of this invention may be separated into four different phases: Phase 1: Registration; Phase 2: Session Establishment; Phase 3: Operation; and Phase 4: Deregistration FIGS. 5A to 5C show a schematic representation of a further embodiment of the present invention. FIG. 5A shows an overview of the architecture for a general embodiment of the invention, which includes message flow of application level data (payload). The remaining message flow comprises the message flow for registration, session handling and localization. Same reference numerals identify elements which are identical or similar to the elements as already described in conjunction with other embodiments. However, FIG. 5A depicts an embodiment with one specific service 304' and an IP Multimedia Subsystem (IMS) 303', in turn comprising the network entity 20, a BM-SC, an MPS, and a Home Subscriber Server (HSS).

The concept of registration and session establishment of this embodiment is shown in FIG. 5B, showing the main message flow by solid arrows, whereas optional and alternative signalling is shown with broken lines. In this embodiment the registration and session establishment phases are principally tightly coupled. Basically, the handshake of session parameters at the end of the registration phase concludes the procedure.

Typically, the service 304' that want to use the network service, e.g. as said geographical service, registers at an early point in time. In general, a new service may register at any time when the system is online. To register, the service sends a "Reg" message 510 to the network entity 20 containing its service ID and communication address parameters (later used to handshake the session parameters with the clients). The service session manager of the network entity 20 replies with a status (e.g. success or failure). On success the service 304' is known to the system as "Service ID" and can be used by the clients (mobile terminals). When a service de-registers then all associated clients optionally may receive an offline notification.

In this general embodiment all clients have to register with the network service before they can use it. To register, the mobile terminals 11 . . . send a "Reg" message 501 to the network entity 20 containing (at least) one target service ID and its own communication address parameters (later used to send messages to the client). Part of the "Reg" message 501 may also be initial location information of the mobile terminal (i.e. grid location information) used by the network service to associate the client to the grid database. The vehicle session manager of the network entity 20 replies with a status (e.g. success or failure) and the targeted services' address parameters. Additionally a "Grid" message 502 is sent to the mobile terminals 11 . . . providing them with the grid information. For authentication and/or authorization it may be optionally provided to access {message 521) the cellular network's subscriber database (HSS) or use (message 522) alternative localization services (e.g. MPS). A client may de-register at any time.

The concept of operation of this embodiment is shown in FIG. 5C, showing the main message flow by solid arrows, whereas optional and alternative signalling is shown with broken lines. The system is in operation phase when at least one service 304' and one client 11 have registered successfully. During operation phase there will be basically two independent communication flows, one on application level and end-to-end between clients and services and second the regular localization procedure for the clients.

Application level messages 504' in uplink direction are sent directly to the service 304' by the clients. The network entity 20 may not be involved in this communication and this guarantees best latency performance and transparency for the application level protocol. The application level messages 504 in downlink direction are to be "geocasted" and therefore sent to the network entity 20 addressing a spatial target area. The target area can be defined e.g. as a closed polygon of coordinates. The network entity 20 then determines the set of clients located in the target area and disseminates the application level message transparently to them. The GeoCast manager component and its methods may achieve a fast and near real time dissemination as discussed below. Optionally and if the network service is aware of other broadcast capabilities in the network serving the target area of a message, it may also in addition forward an application level message to e.g. a BM-SC. In order to take full advantage of such other broadcast functions in the network, clients should indicate to the network service if they are tuned to the corresponding broadcast channel.

All the communications 503, 502', and 522 as shown in FIG. 5C may belong to the localization methods implemented by the location manager and grid database components. Whenever this localization method requires a location update the client will send a "Loc" message 503 with its current location and other mobility, data (e.g. heading, speed . . . ). In turn the client receives back a "Grid" message 502' with possibly new grid information for the purpose of "smart" localization whenever and only when these parameters have changed with regard to the current location of the client. The clients' locations and mobility data may remain inside the operator's network so that they do not have to be disclosed to the (external) services belonging possible to third parties.

With more and more data traffic in mobile networks being based on IP, the industry is consolidating and optimizing its technology foundation to handle and support IP. The IP Multimedia Subsystem (IMS) is a signalling framework designed to enable a completely IP based network. Due to the highly flexible nature of IMS, incl. the separation of the signalling and media, differentiated billing and the open standardized interfaces, a multitude of new services and charging scenarios are possible. IMS is designed by the wireless standards body 3rd Generation Partnership Project (3GPP), and uses internet {IETF=Internet Engineering Task Force) protocols wherever possible, e.g. Session Initiation Protocol (SIP). The internet protocols (IP) that have been used have been enhanced by the IMS framework to meet the high security requirements and reliability of the communication industry. The 3GPP enhancements include features like mobile authentication, QoS, mobility management and billing. An advantage of this standardized signalling infrastructure is to combine the lightweight internet architecture and the communication requirements into single architecture approach.

Components of the IMS core are the HSS (Home Subscriber Server) and the CSCF's (Call Session Control Function). The HSS is a database which contains all the subscriber related data, incl. the subscriber service profile and service triggers. It performs authentication and authorization of the clients, and provides information about the subscriber's location and IP information.

The CSCFs are used to process the SIP signalling packets. There are three different types of CSCF. The Proxy-CSCF (P-CSCF) is the entry point for a terminal to an IMS core. The Serving-CSCF (S-CSCF) is the main node within the signalling plane. It handles the registration requests and authentication of user's in conjunction with information extracted from the HSS. A S-CSCF always maintains the state of all registrations and sessions under its control. The Interrogating-CSCF (I-CSCF) supports the S-CSCFs. It extracts the location data of a user, and routes the call to an appropriate S-CSCF, this ensures a reasonable network load balance. I-CSCF has the ability to find S-CSCFs in other networks to be able to ensure connections worldwide.

Figure 6A:
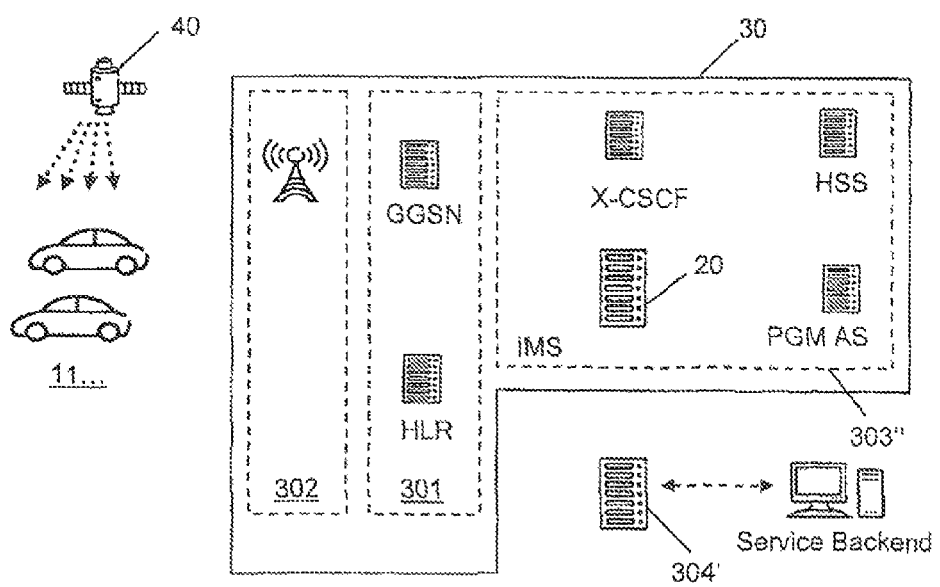
FIGS. 6A to 6D show a schematic representation of another embodiment of the present invention.
Figure 6B:
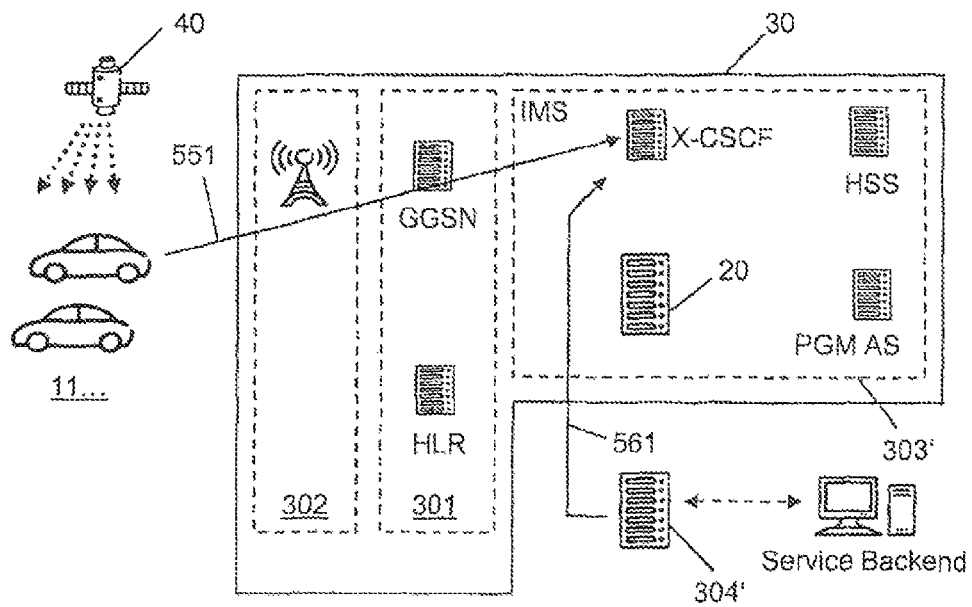

FIGS. 6A to 6B show a schematic representation of another embodiment of the present invention. More specifically, this embodiment relates to deploying the present invention in an IMS core network which then may take advantage of features like mobile authentication, QoS, mobility management, differentiated billing and the open standardized interfaces. FIG. 6A shows a schematic overview of the architecture in an IMS embodiment. Same reference numerals identify elements which are identical or similar to the elements as already described in conjunction with other embodiments. However, FIG. 6A depicts an embodiment with one IP Multimedia Subsystem 303", in turn comprising the network entity 20, an X-CSCF, a PGM AS, and a Home Subscriber Server (HSS). In this case the session manager components of the network entity 20 may act in a Back to Back User Agent (B2BUA) manner and use the SIP protocol. The signalling data flow and application level communication flow is shown accordingly.

The concept of registration of this embodiment is shown in FIG. 6B, showing the main message flow by solid arrows, whereas optional and alternative signalling is shown with broken lines. In this embodiment the registration and session establishment phases are only loosely coupled. The handling of registration including authentication and authorization does not involve the network entity 20 or the network service at all as a function node in signalling. The SIP Register messages are completely handled by the IMS core's Call Session Control Function nodes (CSCFs). FIG. 6B depicts the SIP signalling flow for registration. Any service 304' that wants to make use of network service is required to SIP register with its Public Service ID (PSI) as shown by message flow 561. All clients have to perform a SIP register with their Public User IDs (PUI) as shown by message flow 551. As a result of the service registration the CSCF has initialized its Initial Filter Criteria (IFC). The IFC enable the CSCF to route/chain SIP signalling for the respective service accordingly. The subscriber data from the HSS delivers the association of the Public Service ID with the network service function.

Figure 6C:
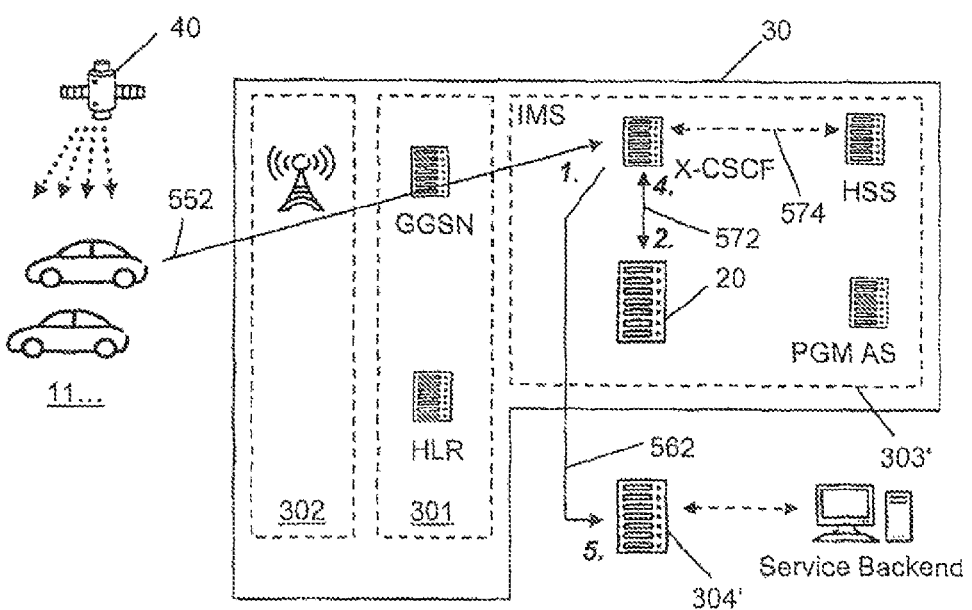

The concept of session establishment of this embodiment is shown in FIG. 6C, showing the main message flow by solid arrows, whereas optional and alternative signalling is shown with broken lines. Like in the embodiment as described in conjunction with FIGS. 5A to 5C, the mobile terminals 11 . . . will have to handshake a session before they can switch into the operational mode. In case of this IMS embodiment the session establishment is performed by means of a SIP Invite message 552 which addresses the wanted service by its Public Service ID.

In particular, the P-CSCF is the entry point from the mobile terminals' perspective. It forwards the Invite message 552 to the responsible S-CSCF which will evaluate the IFC and puts the network service function into the signalling chain. The network service may act in a B2BUA manner;

this means the session description is handshaked individually on its both ends. Therefore the network service will on its part initiate a SIP Invite 572, 562 towards the service 304' which is similarly routed by the CSCFs to the service. The reply message follows back the chain to the network entity 20 and this will on its part reply on the clients invite message 552. The handshaked session descriptions contain the application level communication parameters.

In deviation from the localization signalling in the embodiment as described in conjunction with FIGS. 5A to 5C, in this IMS embodiment the network service may make use of the IMS's Presence, Group and Data Management (PGM) function instead. In case this option is deployed, the network entity 20 will subscribe to the client's specific presences information at the PGM AS during the session establishment as illustrated in FIG. 6C. As this option is specific to the IMS embodiment and distinguishes it from other embodiments, it is assumed to be used in the following discussion.

Figure 6D:
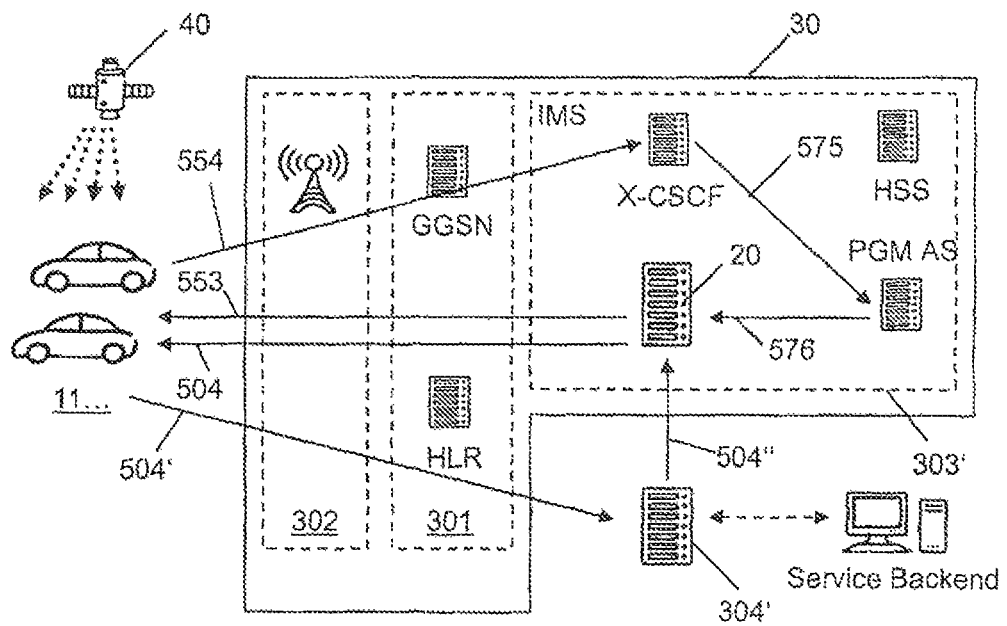

The concept of operation of this embodiment is shown in FIG. 6D, showing the main message flow by solid arrows, whereas optional and alternative signalling is shown with broken lines. Like in the embodiment as described in conjunction with FIGS. 5A to 5C the system is in operation phase when at least one service 304' and one client 11 have established a session successfully. During operation phase there will be basically two independent communication flows, one on application level and end-to-end between clients and services and second the regular localization procedure for the clients (vehicles). FIG. 6D shows these two communication flows for the IMS embodiment. The application level communication shown as 504, 504', and 504" is the same as in the previously described (cf. FIG. 5C) embodiment and therefore not discussed here again. All of the communications 553, 554, 575, and 576 shown in FIG. 6D belong to the localization method which in this embodiment makes use of the IMS's PGM function. When the localization method requires a location update (or crossing information; that is when the individual vehicle crosses a grid line) the client will publish its location and other mobility data (e.g. heading, speed) by a SIP Publish message 554 to the PGM AS. As all SIP messages the Publish 575 will be routed by the CSCFs to the PGM. The network entity 20 has subscription for the client's location information at the PGM and will be notified by the PGM about the updated location by the notification 576.

In turn the client receives back a "Grid" message 553 with new grid information for the localization whenever and only when the respective parameters have changed with regard to the current location of the client. Also in this IMS embodiment the clients' locations and mobility data will never leave the operator's network or be disclosed to the (external) services.

Figure 7:
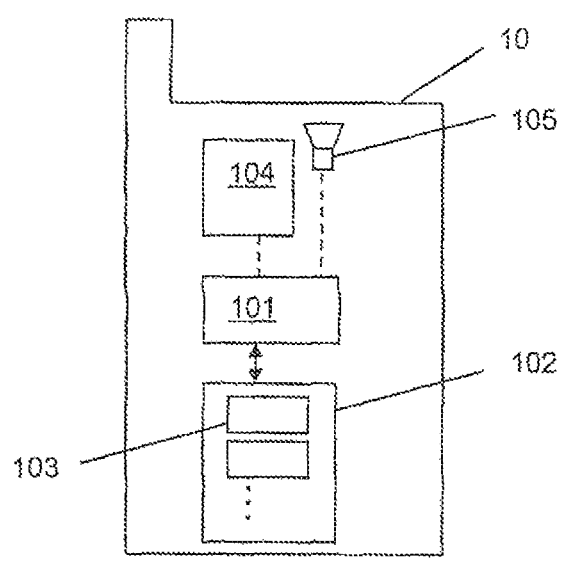
FIG. 7 shows a schematic representation of a mobile terminal according to another embodiment of the present invention.

FIG. 7 shows a schematic representation of a mobile terminal according to another embodiment of the present invention. As shown in FIG. 7 a mobile terminal 10 comprises a processing unit 101 and a memory unit 102. In the memory unit 102 there are memory sections 103 storing data and/or code in order to provide the functions of receiving grid information comprising reference point information and information on grid spacing, wherein a grid covers at least a part of the geographical area with grid fields, framed by grid lines and spaced by said grid spacing; observing a crossing of a grid line based on said grid information and on position information of the mobile terminal; generating crossing information in response to said crossing of a grid line; and sending said crossing information to a network entity over the cellular telecommunication network.

Figure 8A:
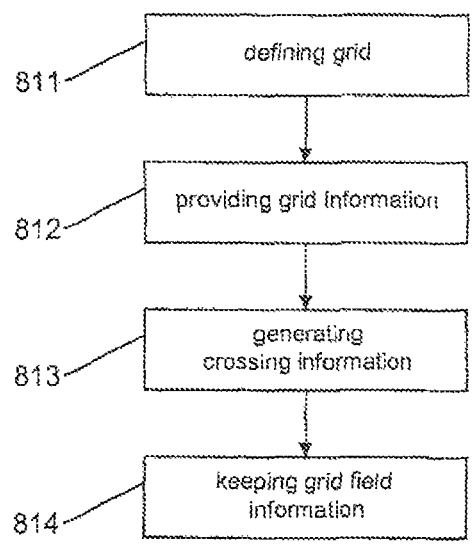
FIGS. 8A to 8D show flowcharts of method embodiments of the present invention.
Figure 8B:
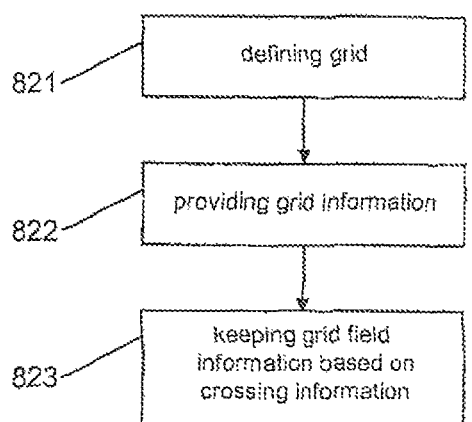

According to other embodiments, the mobile terminal 10 may also comprise display and/or notifications means 104, 105 for outputting optical, vibrational, or acoustic signals to a mobile terminal user for notification of incoming GeoCast messages/information for providing the users with the actual content of such messages. FIG. 8A shows a flowchart of a method embodiment of the present invention. Specifically, the flowchart as depicted in FIG. 8A corresponds to a method of providing a network service of a cellular communications network covering a geographical area for a plurality of mobile terminals. The method according to this embodiment comprises in a step 811 defining a grid covering at least a part of the geographical area with grid fields, framed by grid lines and spaced by a grid spacing; in a step 812 providing grid information comprising reference point information and information on said grid spacing, in a step 813 generating crossing information in response to one of the plurality of mobile terminals crossing one grid line, based on said grid information and on position information of the at least one mobile terminal, and in a step 814 keeping grid field information for at least one grid field comprising identification information of the one mobile terminal when inside the one grid field based on said crossing information. Said method steps 811 through 814—or only some individual steps thereof—may be performed continuously and/or repeatedly. FIG. 8B shows a flowchart of another method embodiment of the present invention. The method according to this embodiment comprises in a step 821 defining a grid covering at least a part of the geographical area with grid fields, framed by grid lines and spaced by a grid spacing; in a step 822 providing to at least one of the plurality of mobile terminals grid information comprising reference point information and information on said grid spacing, and in a step 823 keeping grid field information for at least one grid field comprising identification information of the one mobile terminal when inside the one grid field based on crossing information, wherein said crossing information is generated by said one mobile terminal in response to crossing one grid line, based on said grid information and on position information of the one mobile terminal. Said method steps 821 through 823—or only some individual steps thereof—may be performed continuously and/or repeatedly.

Figure 8C:
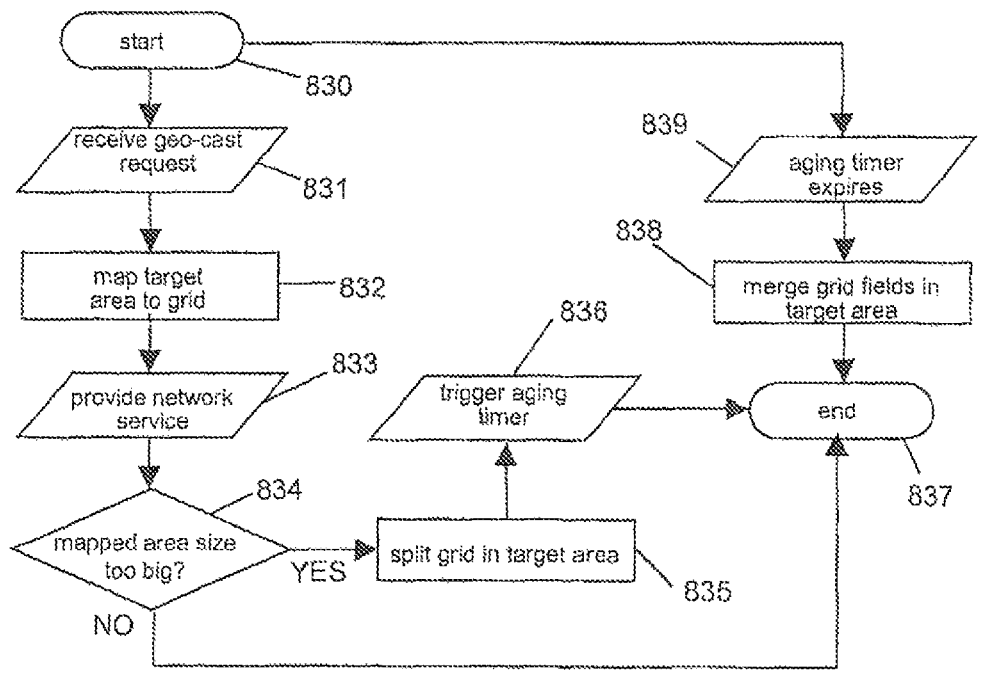
Figure 8D:
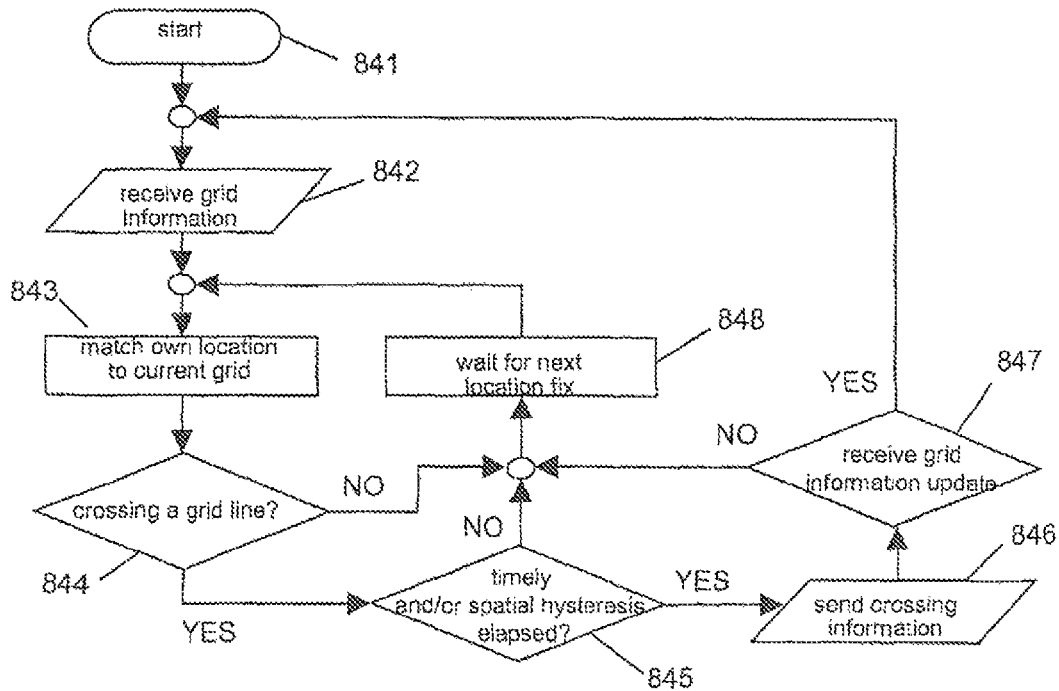

FIG. 8C shows a flowchart of another method embodiment of the present invention. This method is started at a starting point 830 and either continues by receiving a GeoCast request in step 831 or in the instance that an aging timer expires in step 839. For the case that the method continues with step 831, a target area to be serviced by a network service is mapped to a grid in step 832. In a step 833, the network service is provided, for example by means of the localized information service and/or the geographical service. In a verification step 834, it is continuously verified whether the mapped area size is too big compared to the target area size. If this is not the case, the method comes to an end 837. However, if the verification step 834 yields YES, the grid is split in the target area in step 835. This would subsequently trigger an aging timer in step 836. Once this aging timer expires in step 839, the grid fields are again merged in the target area in step 838, in other words, the grid spacing is again reduced to a higher value. FIG. 8D shows a flowchart of yet another method embodiment of the present invention. This method describes an embodiment on one of the mobile terminals 11 . . . . This method is firstly started at point 841 and firstly receives grid information in step 842. Based on the received grid information, the mobile terminal 11 . . . may match the own location to the current grid, i.e. with reference to the reference information, the actual position information of the mobile terminal and the grid spacing in step 843. The mobile terminal then continuously observes the crossing of a grid line in step 844. If such crossing is determined, a timely and/or a spatial hysteresis is to be waited to elapse in step 845. If this hysteresis has elapsed, the mobile terminal sends crossing information in step 846. In response to sending this crossing information in step 846, the mobile terminal may receive a grid information update in step 847. If such grid information update is received, the method continues with step 842. When either no grid information update is received in step 847 or no crossing of a grid line is observed in step 844, the method continues to step 848, in which it is waited for a next location fix. If such a next location fix is obtained in step 848, for example by acquiring respective information from a positioning module, the method continues again with step 843, for matching the own location to the current grid.

In general, the network service does not handle all subscribers of an operator's network automatically. Instead the network service may require a registration procedure. Mobile terminals (vehicles) that are interested in the respective service (s), register to the network service with their service address information. In specific embodiments that use the IP Multimedia Subsystem (IMS) subscriber information may even be provided (partially) by the cellular network's subscriber database. Having a registration procedure may imply having a corresponding deregistration procedure as well.

All services which want to use the network service may also be required to register with a service ID and their service address information before they can start sending the so-called GeoCast messages and/or use the network service as some other kind of geographical service which may not necessarily involve distribution of information and/or messages to the mobile terminals. In specific embodiments that use the IP Multimedia Subsystem (IMS) the IMS Public Service ID might even become the service ID.

The proposed network service may provide one or more advantages:

The so-called horizontal approach enables the network service to be implemented as a common function in an operator's network. Services that use this function are relieved from maintaining their own client database with all clients' locations and update this information regularly.

Signalling traffic and execution load for positioning tasks are generated only once for a multitude of services, thus impacting system capacity positively.

Having a common network service may drastically reduce the implementation effort for new services that want to use GeoMessaging-, GeoCast-, geographical service and/or localized information service functionalities. These services as such do not need to perform localizations at all.

The proposed smart and optimized implementation of the grid database enables fast, near real time and efficient location based information distribution with a minimized signalling overhead.

The ability of the grid database to locally adapt the grid spacing to the spatial client density and/or the network service target area profile allows optimizing the localization signalling and network service target group sizes.

Scalability of the system can easily be achieved by load balancing multiple nodes providing the network service or a part thereof, each serving a different part of the served spatial area.

In the IMS embodiment the network service functionality may integrate into the core network eco-system. Especially when IMS sessions are used, the network service functions can take advantage of QoS measures and a PGM in the core network.

The network service function is not limited to IP based services, e.g. it will also be suitable to enable fast and efficient mass SMS.—For service providers using the proposed network service functionalities there is no need to ask for user consensus as no location information leaves the operator's network.

According to further embodiments, it may be preferable that the clients (i.e. mobile terminals) using the network service cover/provide the following components: a cellular communication module {GSM, GPRS, EDGE, UMTS, HSPA, LTE . . . }; a positioning module {GPS, Galileo . . . ) for higher localization accuracy; a display and/or speakers to inform users {drivers) about incoming information. Although detailed embodiments have been described, these only server to provide a better understanding of the invention defining by the independent claims, and are not be seen as limiting.

The invention claimed is:

1. A method of operating a network entity providing a network service of a cellular communication network covering a geographical area for a plurality of mobile terminals, the method comprising:
   defining a grid covering at least a part of the geographical area with grid fields, framed by grid lines and spaced by a grid spacing;
   providing to one mobile terminal of the plurality of mobile terminals grid information associated with the grid, and
   keeping grid field information for at least one grid field comprising identification information of the one mobile terminal when inside the one grid field based on crossing information that is generated by the one mobile terminal,
   wherein said crossing information is received from the one mobile terminal in response to crossing one grid line, based on said grid information and on position information of the one mobile terminal.

2. The method of claim 1, further comprising sending a message to the one mobile terminal of the plurality of mobile terminals based on said grid field information.

3. The method of claim 1, further comprising providing as part of said network service a geographical service based on said grid field information to a further entity, wherein the geographical service comprises a registering of the further entity to the geographical service, and wherein said providing of the geographical service is dependent on said registering to the geographical service.

4. The method of claim 1, further comprising providing as part of said network service a localized information service to at least a part of the plurality of mobile terminals, wherein providing the localized information service comprises a registering of one mobile terminal of the plurality of mobile terminals to the localized information service, and wherein the providing of the localized information service is dependent on said registering to the localized information service.

5. The method of claim 4, wherein said registering comprises providing said grid information to said one mobile terminal.

6. The method of claim 1, further comprising changing said grid spacing.

7. The method of claim 1, wherein the cellular communication network covers the geographical area with cells, and wherein the grid fields are independent from said cells.

8. The method of claim 1, further comprising:
receiving a request for a geographical service; and
sending a message to the at least one of the plurality of mobile terminals based on the request.

9. The method of claim 1, further comprising:
generating grid location information indicating a grid field covering a location of one mobile terminal of the plurality of mobile terminals, said generating being based on said grid information and on said position information of the one mobile terminal, wherein said grid field information is kept also based on said grid location information.

10. A network entity of a cellular communication network covering a geographical area for a plurality of mobile terminals, the network entity comprising a processing unit being configured to perform operations comprising:
defining a grid, the grid covering at least a part of the geographical area with grid fields, framed by grid lines and spaced by a grid spacing;
providing to one mobile terminal of the plurality of mobile terminals grid information, and
keeping grid field information for at least one grid field comprising identification information of the one mobile terminal when inside the one grid field based on crossing information,
wherein said crossing information that is generated by the one mobile terminal is received from said one mobile terminal in response to crossing one grid line, based on said grid information and on position information of the one mobile terminal.

11. The network entity of claim 10, wherein the processing unit is further configured to perform operations comprising:
providing as part of said network service a localized information service to at least a part of the plurality of mobile terminals,
wherein providing the localized information service comprises a registering of one of the plurality of mobile terminals to the localized information service, and
wherein the providing of the localized information service is dependent on said registering to the localized information service.

12. The network entity of claim 10, wherein said registering comprises providing said grid information to said one mobile terminal.

13. The network entity of claim 10, wherein the processing unit is further configured to perform operations comprising changing said grid spacing.

14. The network entity of claim 10, wherein the cellular communication network covers the geographical area with cells, and wherein the grid fields are independent from said cells.

15. A mobile terminal for use in a cellular communication network covering a geographical area, the mobile terminal comprising a processing unit configured to perform operations comprising:
receiving grid information, wherein the grid information comprises a grid that covers at least a part of the geographical area with grid fields, framed by grid lines and spaced by grid spacing;
observing a crossing of a grid line based on said grid information and based on position information of the mobile terminal;
generating crossing information in response to said crossing of a grid line;
sending said crossing information to a network entity over the cellular communication network;
sending a first application level message directly to a further entity; and
receiving, from the network entity, a second application level message, in response to the first application level message sent directly to the further entity.

16. The mobile terminal of claim 15,
wherein the second application level message comprises a broadcast message to one or more mobile terminals in a spatial target area, the one or more mobile terminals comprising the mobile terminal.

17. A mobile terminal for use in a cellular communication network covering a geographical area, the mobile terminal comprising a processing unit configured to perform operations comprising:
receiving grid information, wherein the grid information comprises a grid that covers at least a part of the geographical area with grid fields, framed by grid lines and spaced by grid spacing;
observing a crossing of a grid line based on said grid information and based on position information of the mobile terminal;
generating crossing information in response to said crossing of a grid line;
sending said crossing information to a network entity over the cellular communication network; and
sending a location message to the network entity, the location message comprising information associated with a current location of the mobile terminal,
wherein the grid information is received in response to the location message.

18. The mobile terminal of claim 17,
wherein the grid information is received only if the current location of the mobile terminal is different from a location indicated by the grid information.

19. The mobile terminal of claim 17,
wherein the location message further comprises heading information or speed information of the mobile terminal.

20. A method in a mobile terminal in a cellular communication network covering a geographical area, the method comprising:
receiving grid information, wherein the grid information comprises a grid that covers at least a part of the geographical area with grid fields, framed by grid lines and spaced by grid spacing;
observing a crossing of a grid line based on said grid information and based on position information of the mobile terminal;
generating crossing information in response to said crossing of a grid line;
sending said crossing information to a network entity over the cellular communication network;
sending a first application level message directly to a further entity; and
receiving, from the network entity, a second application level message, in response to the first application level message sent directly to the further entity.

21. The method of claim 20, wherein the second application level message comprises a broadcast message to one or more mobile terminals in a spatial target area, the one or more mobile terminals comprising the mobile terminal.

22. A method in a mobile terminal in a cellular communication network covering a geographical area, the method comprising:
   sending a location message to a network entity, the location message comprising information associated with a current location of the mobile terminal;
   receiving grid information in response to the location message, wherein the grid information comprises a grid that covers at least a part of the geographical area with grid fields, framed by grid lines and spaced by grid spacing;
   observing a crossing of a grid line based on said grid information and based on position information of the mobile terminal;
   generating crossing information in response to said crossing of a grid line; and
   sending said crossing information to the network entity over the cellular communication network.

23. The method of claim 22,
   wherein the grid information is received only if the current location of the mobile terminal is different from a location indicated by the grid information.

24. The method of claim 22,
   wherein the location message further comprises heading information or speed information of the mobile terminal.

* * * * *